United States Patent

Ohnuki

[11] Patent Number: 5,216,697
[45] Date of Patent: Jun. 1, 1993

[54] SIGNAL QUALITY DETECTOR CIRCUIT
[75] Inventor: Masayuki Ohnuki, Nasu, Japan
[73] Assignee: Fujitsu Limited, Kanagawa, Japan
[21] Appl. No.: 567,154
[22] Filed: Aug. 14, 1990
[30] Foreign Application Priority Data
Aug. 19, 1989 [JP] Japan .................................. 1-213451
[51] Int. Cl.⁵ ............................................. H04L 1/20
[52] U.S. Cl. ...................................... 375/100; 345/10; 328/149; 455/35.1; 371/71
[58] Field of Search ...................... 375/100, 11, 12, 10, 375/40, 39; 455/296, 133, 134, 135, 303; 371/71, 48; 328/162, 163, 147-149

[56] References Cited
U.S. PATENT DOCUMENTS
4,070,615  1/1978  Crop ................................. 328/149 X
4,530,087  7/1985  Yamamoto ..................... 375/100 X
4,769,825  9/1988  Vogel .............................. 375/100 X Primary Examiner—Curtis Kuntz
Assistant Examiner—Tesfaldet Bocure
Attorney, Agent, or Firm—Staas & Halsey

[57] ABSTRACT

A signal quality detector circuit which detects an error signal of an input signal, used for detecting transmission quality of a transmission line. The detector circuit equalizes the input baseband signal, analog-to-digital-converts the equalized signal to a digital bit signal, analog-to-digital converts the input baseband signal to a digital bit signal, compares the two analog-to-digital converted signals on a bit-by-bit basis and detects an error signal accumulates the error signal in a unit time, and detects transmission quality of a transmission line.

6 Claims, 3 Drawing Sheets 05,216,697

SIGNAL QUALITY DETECTOR CIRCUIT

BACKGROUND OF THE INVENTION

1. Field of the Invention

The present invention relates to a signal quality detector circuit used, for example, in a digital microwave radio system. Signals transmitted over microwave radio lines (simply called lines hereafter) are subject to radio interferences such as fading and distortion while being transmitted through the air. Such interference causes a deterioration in transmission quality. Generally, digital microwave radio systems have a plurality of regular lines and at least one alternative line. When deterioration in transmission quality is detected on a regular line that is currently being used, the regular line is replaced with an alternative line. Therefore, it is necessary to detect both signal quality and deterioration in transmission quality correctly and quickly.

2. Description of the Related Art

FIG. 1 is a schematic block diagram of a system for practicing an existing method of detecting signal quality in a digital microwave radio system. At the sending end, a digital data signal is input to transmitter 81. A parity generator (called PG hereafter) 82 adds a parity bit to, for example, every 7 data bits. Transmitter 81 performs a digital-to-analog conversion to convert the digital data and parity bit to an analog signal. The transmitter 81 then modulates the converted baseband signal using, for example, quadrature amplitude modification (called QAM or QAM modification hereafter), and transmits the modulated signal over a regular line 100a.

At the receiving end, the signal received via regular line 100a is input to receiver 91. The receiver 91 demodulates the QAM-modulated signal and converts the demodulated analog baseband signal into a digital data signal. A parity checker (called PC hereafter) 92 checks the baseband bit signal for proper parity. When the number of parity errors in a unit time (or error rate) exceeds a predetermined number (or value), PC 92 sends a command to the sending end over control line 300a to switch regular line 100a to an alternative line (not shown).

However, proper operation of the FIG. 1 system depends upon, for example, proper parity error checking. But, since parity is checked, for example, only every 8 bits (a byte), multiple-bit errors in a byte normally cannot be detected. This causes an undercount in bit errors and prevents detection of deterioration in transmission quality. There is another problem with the parity error checking system shown in FIG. 1. The addition of a redundant parity bit to, for example, every 7 data bits reduces transmission efficiency to a great extent.

SUMMARY OF THE INVENTION

An object of the present invention is to detect signal quality of a line quickly and correctly.

Another object of the present invention is to detect signal quality of a line without reducing transmission efficiency.

Still another object of the present invention is to provide a simple circuit for detecting signal quality of a line.

To achieve the above and other objects, the present invention provides an apparatus for equalizing an input baseband signal, analog-to-digital-converting the equalized signal to a digital bit signal, analog-to-digital-converting the input baseband signal to a digital bit signal, comparing the two analog-to-digital-converted digital bit signals on a bit-by-bit basis, and detecting signal quality according to the inequality of the comparison result.

BRIEF DESCRIPTION OF THE DRAWINGS

Throughout the above-mentioned drawings, identical reference numbers designate the same or similar component parts.

DESCRIPTION OF THE PREFERRED EMBODIMENT

Figure 1:
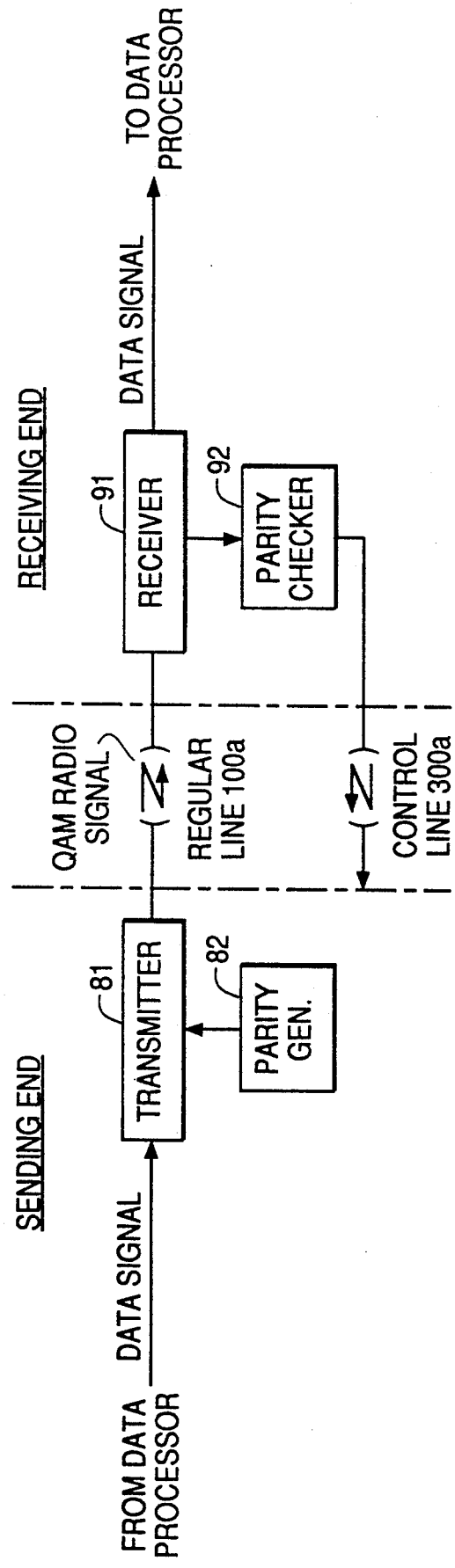
FIG. 1 is a schematic block diagram of a system for practicing an existing method to detect signal quality.
Figure 2:
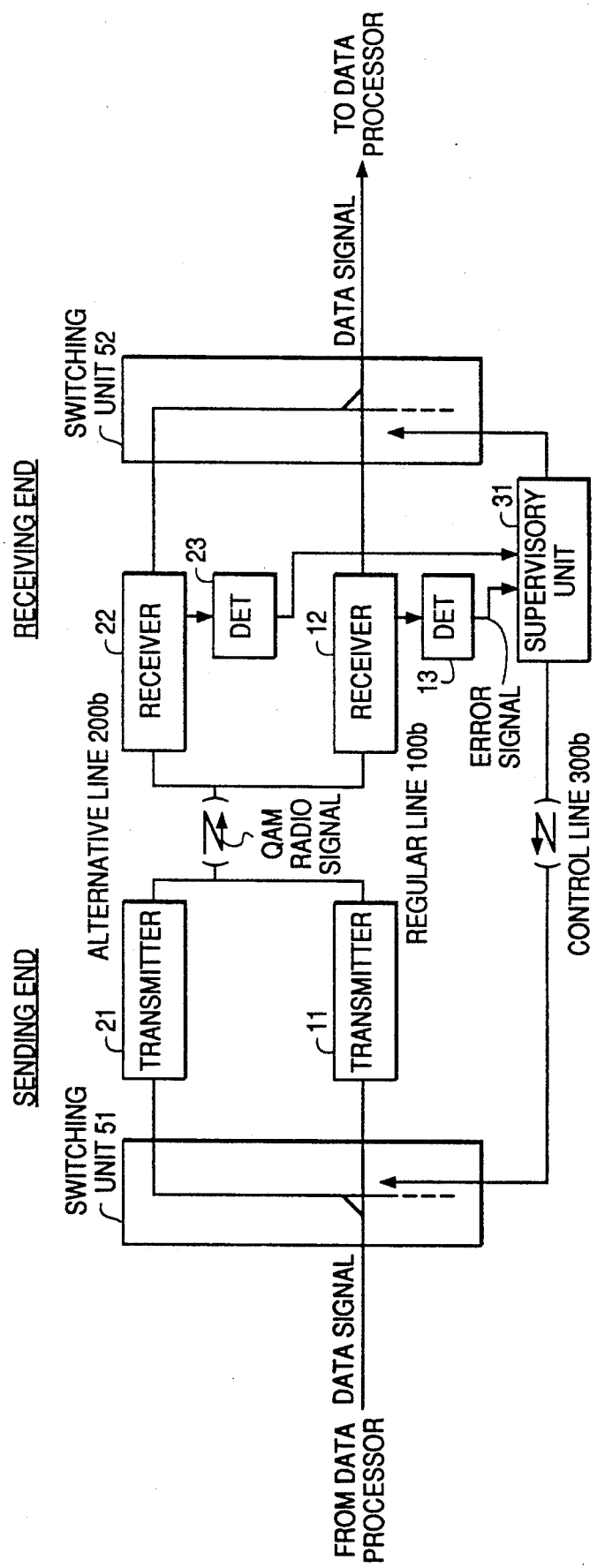
FIG. 2 is a schematic block diagram showing a digital microwave radio system and a signal quality detector circuit for practicing the present invention.

FIG. 2 is a schematic block diagram showing a digital microwave radio system and a signal quality detector circuit for practicing the present invention. Digital microwave radio systems usually have a plurality of regular lines and at least one alternative line. However, for easy understanding, only one regular line and one alternative line are shown in FIG. 2. The FIG. 2 system includes a sending end and a receiving end. The sending end receives a digital data signal from data processors such as terminals. A transmitter 11 receives this digital data signal via switching unit 51. Transmitter 11 digital-to-analog converts the digital data signal into an analog baseband signal. This analog signal is then modulated into a QAM-modulated signal and transmitted over a regular line 100b to the receiving end. At the receiving end, a receiver 12 receives the QAM-modulated signal from regular line 100b. The receiver 12 demodulates the QAM-modulated signal into a baseband signal and converts the baseband signal to a digital data signal. The converted digital data signal is output to a data processor (not shown) via a switching unit 52.

In a microwave radio system, signals are subject to radio interferences such as fading and undergo waveform distortion. A signal quality detector circuit (called DET hereafter) 13 shown in FIG. 2 checks the signal received by the receiver 12 in order to detect signal quality. When the DET detects that deterioration in transmission quality has reached a predetermined level, for example, an error rate over $10^{-6}$, it outputs an error signal to a supervisory unit (called SVU hereafter) 31. In response to the error signal, the SVU sends a switch command to the sending end. The switch command requests that transmission over the regular line 100b be switched to an alternative line 200b. The switch command is sent to the sending end over a control line 300b which is provided between the both ends to communicate line control and management information.

On receipt of the switch command, the switching unit 51 connects the digital data signal to alternative line 200b (i.e., to transmitter 21) in parallel with the regular line 100b. As is the case with regular line 100b, the data signal input to transmitter 21 is digital-to-analog converted, QAM-modulated and transmitted over alternative line 200b to the receiving end. Meanwhile, at the receiving end, the QAM-modulated signal from alternative line 200b is received by receiver 22. When SVU 31 does not detect deterioration of transmission quality based on the signal quality information from DET 23, SVU 31 controls switching unit 52 to switch from the regular line 100b to the alternative line 200b. Thus, switching between the lines including transmitters and receivers is performed.

Figure 3:
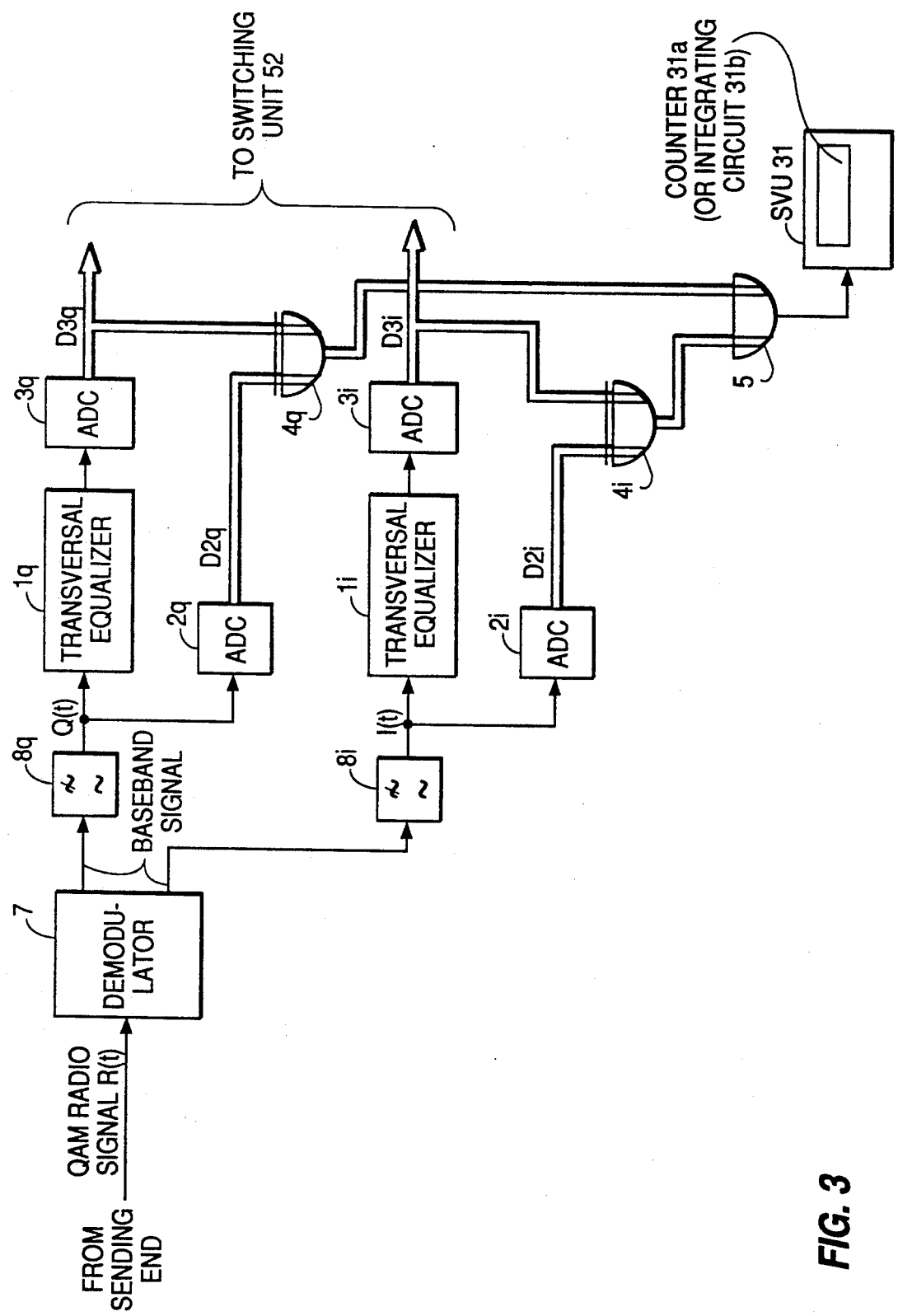
FIG. 3 is a block diagram of a signal quality detector circuit embodying the present invention.

FIG. 3 is a detailed block diagram of the receiver 12 and the DET 13 of FIG. 2. In FIG. 3, the receiver 12 of FIG. 2 includes a demodulator 7, low-pass filters 8q and 8i, transversal equalizers 1q and 1i, analog-to-digital converter (called ADC hereafter) 3q and ADC 3i. The signal quality detector (DET) 13 of FIG. 2 includes ADCs 2q and 2i, exclusive OR circuit (called EOR hereafter) 4q, EOR 4i and OR circuit (called OR hereafter) 5.

As shown in FIG. 3, QAM-modulated radio signal R(t) is input to demodulator 7, which performs a synchronous-detection on the signal R(t) to demodulate the signal and to generate a baseband signal. The outputs of demodulator 7 are input to low-pass filters 8q and 8i, which attenuate or eliminate the harmonics from the signal to recover the baseband signal elements Q(t) and I(t). These signals differ in phase by 90°.

The Q(t) signal is input, in parallel, to transversal equalizer 1q which compensates for the distortions in the received signal, and is input to ADC 2q. The ADC 2q converts the analog signal Q(t) to a digital signal D2q that includes, for example, 2 bits for each 16-valued QAM(t). The output of equalizer 1q is input to another ADC 3q that converts it into a digital signal D3q. Two bits each of D2q and D3q are input to an exclusive OR gate EOR 4q (e.g., 2 EOR gates). EOR 4q compares incoming bit strings from ADCs 2q and 3q for equality on a bit-by-bit basis and outputs a logical 1 when an inequality is detected. That is, when the not-equalized signal D2q is unequal to the equalized signal D3q which should be a correct signal, EOR 4q determines that the radio signal is distorted enough to result in a deterioration of transmission quality.

As seen in FIG. 3, I(t) is input to a circuit similar to the circuit that processes Q(t). This circuit includes transversal equalizer 1i, ADC 2i, ADC 3i and EOR 4i. Digital signals D3q and D3i from ADCs 3q and 3i are combined in a later stage (not shown) to reproduce the binary data sent from the sending end.

In FIG. 3, an OR gate 5 (e.g., a 4-input OR gage) performs a logical OR operation on the outputs of EOR 4q and 4i. Basically, this operation checks to see if either or both of the EOR gates 4q and 4i is providing an output that indicates inequality. That is, when bit data D2q and D3q are equal, i.e., both are logical zeros or ones, the Q element of the bit data is valid; otherwise the Q element is invalid. The same is true with data D2i and D3i. Thus, when both Q and I elements are valid, the bit data reproduced using D3q and D3i should be valid.

Supervisory unit (SVU) 31 accumulates the output of OR 5 by counting in a digital counter 31a (or integrating in an analog integrating circuit 31b). When a count or integrated value exceeds a predesignated number (or threshold value in the case of an analog integrating circuit 31b), SVU 31 detects deterioration in transmission quality. Upon detecting deterioration, the SVU 31 sends the switch command to switching unit 51 at the sending end and later to switching unit 52 at the receiving end.

Thus, with simple circuits, the present invention detects signal quality and a deterioration in transmission quality quickly and accurately, without reducing transmission efficiency.

We claim:

1. A signal quality detector circuit for detecting signal quality of an input signal, said signal quality detector circuit comprising:
   equalization means for compensating for distortions in the input signal and for providing a compensated analog output;
   first conversion means for converting the compensated analog output signal to a first digital signal;
   second conversion means for converting the input signal to a second digital signal;
   comparison means for comparing the first and second digital signals and for providing an error signal; and
   detection means for detecting signal quality of the input signal based on said error signal.

2. A signal quality detector circuit according to claim 1, wherein said comparison means includes means for providing said error signal when said first and second digital signals differ by at least one bit, and wherein said detection means comprises accumulation means for accumulating said error signal for a predetermined time and means for detecting transmission quality based on said accumulation.

3. A signal quality detector circuit according to claim 2, wherein said accumulation means includes counter means for counting said error signal.

4. A signal quality detector circuit according to claim 2, wherein said accumulation means includes integrating means for integrating said error signal.

5. A signal quality detector circuit according to claim 2, further comprising:
   receiver means for receiving the input signal from at least one of a regular line and an alternative line; and
   means for providing a switch command based on said error signal so that said receiver means receives said input signal from the alternative line.

6. A signal quality detector circuit according to claim 5, wherein said receiver means includes means for receiving quadrature amplitude modulated signals.

* * * * *